(12) United States Patent
Im et al.

(10) Patent No.: US 12,535,184 B2
(45) Date of Patent: Jan. 27, 2026

(54) COMPOSITE MATERIAL PRESSURE VESSEL WITH STRAIN SENSOR AND METHOD OF MANUFACTURING THE SAME

(71) Applicant: GLOBIZ CO., LTD., Seoul (KR)

(72) Inventors: Jong Soon Im, Seoul (KR); Jun Sik Im, Seoul (KR)

(73) Assignee: GLOBIZ CO., LTD., Seoul (KR)

( * ) Notice: Subject to any disclaimer, the term of this patent is extended or adjusted under 35 U.S.C. 154(b) by 0 days.

(21) Appl. No.: 18/565,173

(22) PCT Filed: Nov. 25, 2022

(86) PCT No.: PCT/KR2022/018847
§ 371 (c)(1),
(2) Date: Nov. 29, 2023

(87) PCT Pub. No.: WO2023/229123
PCT Pub. Date: Nov. 30, 2023

(65) Prior Publication Data
US 2025/0092995 A1    Mar. 20, 2025

(30) Foreign Application Priority Data
May 24, 2022    (KR) .................. 10-2022-0063156

(51) Int. Cl.
*F17C 13/02*    (2006.01)
*F17C 1/06*    (2006.01)
(Continued)

(52) U.S. Cl.
CPC .................. *F17C 1/06* (2013.01); *G01L 1/22* (2013.01); *G01L 19/0092* (2013.01);
(Continued)

(58) Field of Classification Search
CPC .......... F17C 1/06; F17C 13/02; F17C 13/025; F17C 13/026; F17C 2209/2153;
(Continued)

(56) References Cited

U.S. PATENT DOCUMENTS 5,522,428 A * 6/1996 Duvall .................. F17C 13/123
141/94

FOREIGN PATENT DOCUMENTS

CN    106838601 A *    6/2017    ............ F17C 13/025
CN    213159111    5/2021
(Continued)

*Primary Examiner* — Herbert K Roberts
(74) *Attorney, Agent, or Firm* — LEX IP MEISTER, PLLC

(57) ABSTRACT

A method of manufacturing a composite material pressure vessel is provided. The method may include preparing a liner provided with an entrance portion; and forming an inner shell by winding at least one composite material filament around the liner, wherein the forming of the inner shell includes simultaneously winding a plurality of enamel wire strain sensors around the liner together with the composite material filament by differentiating a start point where each of the plurality of enamel wire strain sensors manufactured in the form of a filament starts to be wound around the liner.
A composite material pressure vessel is further manufactured by using the method.

12 Claims, 3 Drawing Sheets

(51) Int. Cl.
*G01L 1/22* (2006.01)
*G01L 19/00* (2006.01)

(52) U.S. Cl.
CPC .......................... *F17C 2201/0109* (2013.01); *F17C 2201/058* (2013.01); *F17C 2209/2154* (2013.01); *F17C 2221/012* (2013.01)

(58) Field of Classification Search
CPC .... F17C 2209/2163; G01L 1/22; G01L 1/225; G01L 1/2256; G01L 1/2262; G01L 1/2268; G01L 1/2275; G01L 1/2281; G01L 1/2287; G01L 1/2293
See application file for complete search history.

(56) References Cited

FOREIGN PATENT DOCUMENTS

| | | | | |
|---|---|---|---|---|
| CN | 213159111 U | * | 5/2021 | |
| DE | 102008019594 A1 | * | 10/2009 | ........... F02D 19/026 |
| DE | 102017200302 A1 | * | 7/2018 | ................ F17C 1/06 |
| DE | 102017223652 A1 | * | 6/2019 | ........... F17C 13/123 |
| JP | 10030797 A | * | 2/1998 | |
| JP | 2006-275223 | | 10/2006 | |
| JP | 2006275223 A | * | 10/2006 | |
| JP | 2007-139143 | | 6/2007 | |
| JP | 2007139143 A | * | 6/2007 | |
| KR | 100658116 B1 | * | 12/2006 | ....... B60K 15/03006 |
| KR | 20160086459 A | * | 7/2016 | ............. B60K 15/07 |
| KR | 10-2018-0111728 | | 10/2018 | |
| KR | 10-2364090 | | 2/2022 | |
| KR | 10-2022-0056265 | | 5/2022 | |
| KR | 20220056265 A | * | 5/2022 | .............. F17C 1/005 |

\* cited by examiner

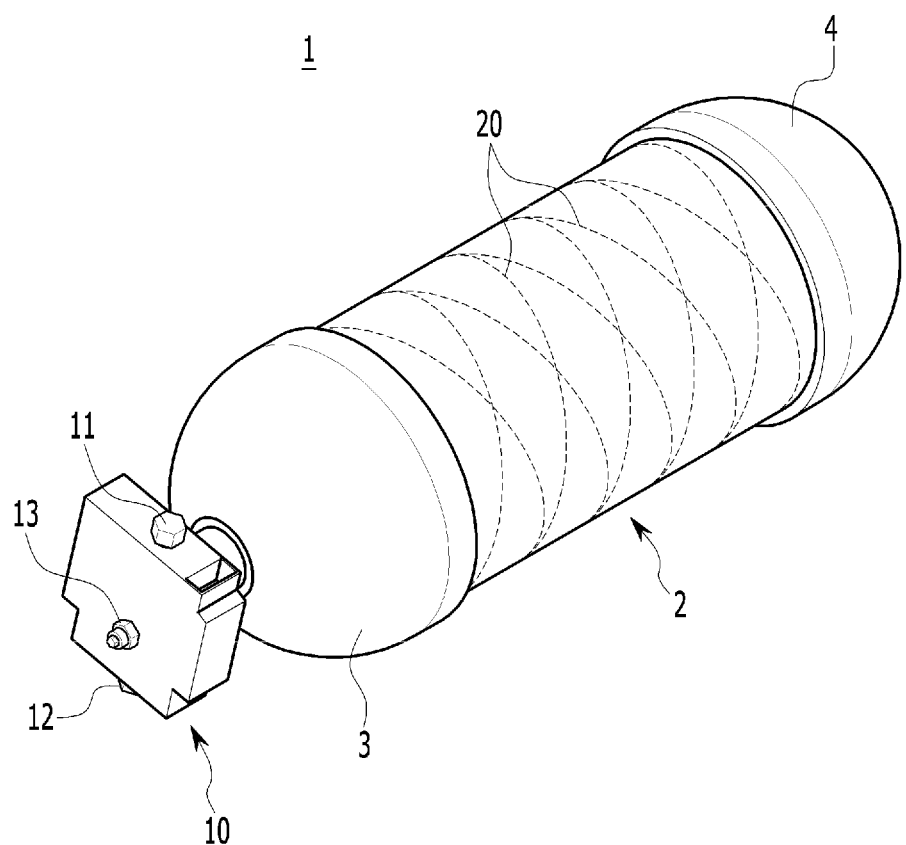
[Figure 1]

[Figure 2]
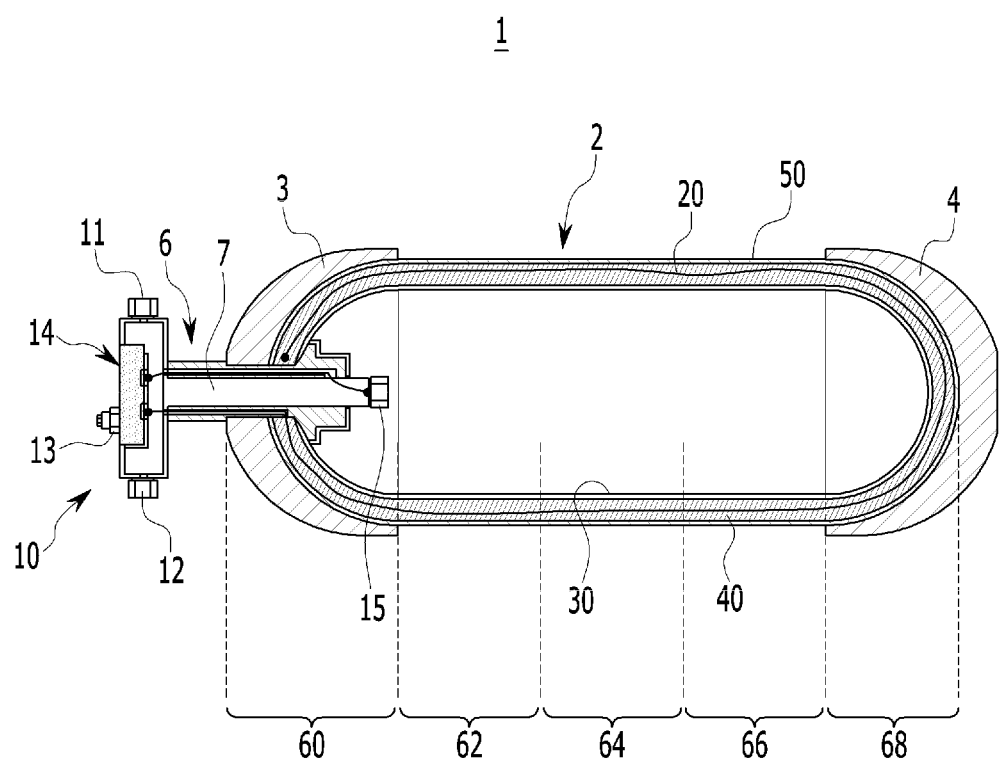

[Figure 3]
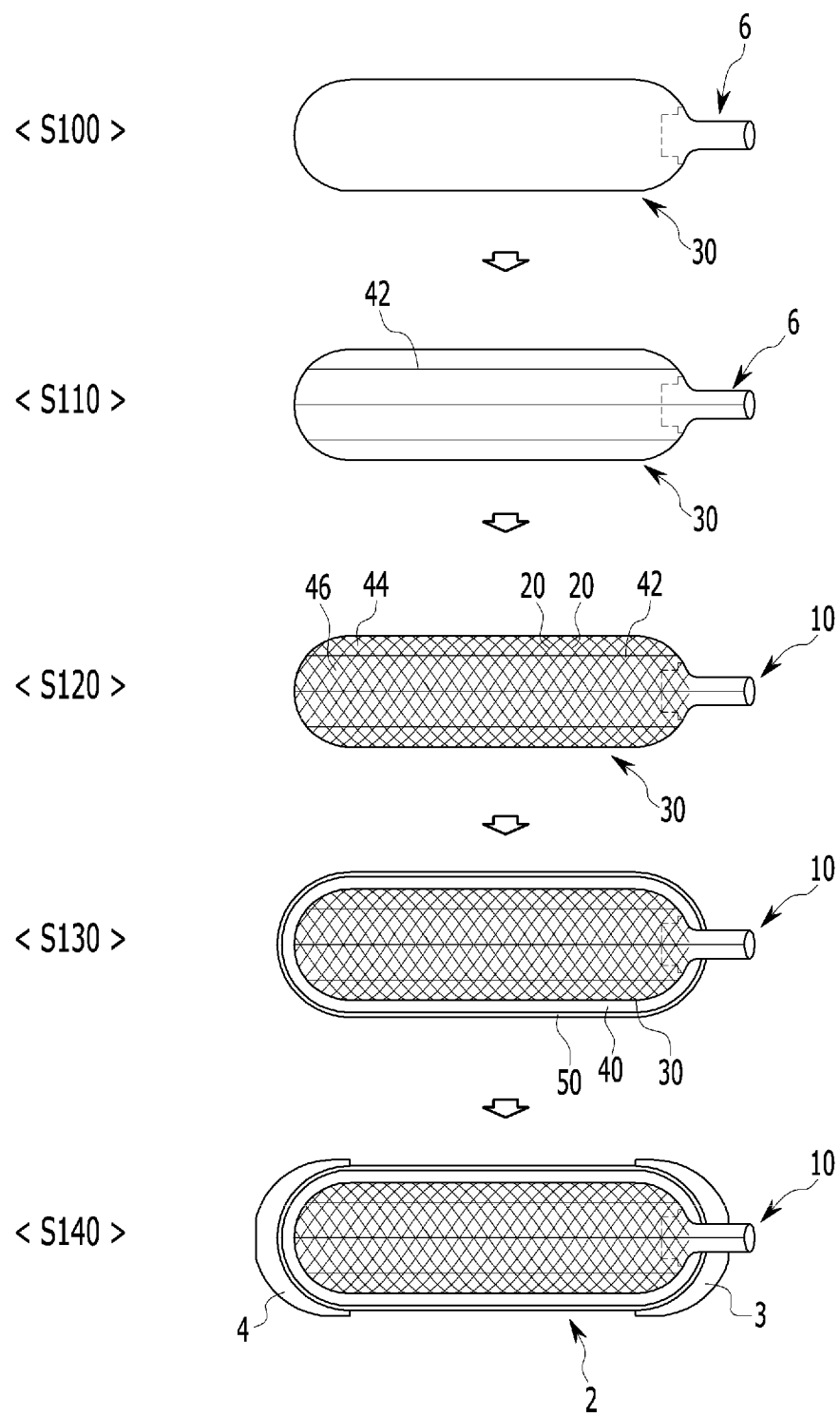

COMPOSITE MATERIAL PRESSURE VESSEL WITH STRAIN SENSOR AND METHOD OF MANUFACTURING THE SAME

TECHNICAL FIELD

The present invention relates to a composite material pressure vessel with a strain sensor and a method of manufacturing the composite material pressure vessel with the strain sensor, and more particularly, to a composite material pressure vessel with a strain sensor to diagnose a defect and predict the remaining life of the composite material pressure vessel and a method of manufacturing the composite material pressure vessel with the strain sensor.

BACKGROUND ART

Due to climate changes caused by an environmental pollution, interest in eco-friendly energy sources is gradually growing. In particular, transportation devices such as cars, buses, trucks, ships, railroads, and airplanes use electricity or hydrogen as energy sources instead of existing fossil fuels.

When a hydrogen storage device used in a hydrogen vehicle or hydrogen railway vehicle is damaged, because a serious accident may occur, the hydrogen storage device may be able to withstand a high pressure of about 700 bar and need to maintain durability even through charging more than 20,000 times. Defects may occur even in hydrogen storage devices with guaranteed durability due to the use or external impact, and thus, it is necessary to introduce a structural health monitoring (SHM) system of hydrogen storage devices.

For SHM, physical values indicating structural health need to be appropriately selected and accurately measured. To this end, it is necessary to research into mounting locations and mounting methods of sensors capable of accurately measuring physical values.

One of the physical values indicating structural health is strain. Resistance-type strain sensors of the related art were able to measure strain only in a local area where the strain sensor is mounted. Therefore, to monitor the condition of a large area, a large number of strain sensors need to be mounted, and as the number of channels increases, costs increase, and commercialization is not easy.

The matters described in the Background section are drafted to enhance the understanding of the background of the invention, and may include matters that are not already known to those of ordinary skill in the art to which this technology pertains.

DISCLOSURE

Technical Problem

The present disclosure attempts to provide a sensor for structural health monitoring (SHM) of a composite material pressure vessel, in particular, a composite material pressure vessel with a strain sensor.

The present disclosure also attempts to provide a method of manufacturing a composite material pressure vessel with a strain sensor.

Technical Solution

A method of manufacturing a composite material pressure vessel according to an embodiment of the present invention includes preparing a liner provided with an entrance portion; and forming an inner shell by winding at least one composite material filament around the liner, wherein the forming of the inner shell includes simultaneously winding a plurality of enamel wire strain sensors around the liner together with the composite material filament by differentiating a start point where each of the plurality of enamel wire strain sensors manufactured in the form of a filament starts to be wound around the liner.

In an aspect, the plurality of enamel wire strain sensors may be evenly wound around the entire area of the composite material pressure vessel.

In another aspect, the plurality of enamel wire strain sensors may be wound around the composite material pressure vessel at locally different concentrations.

In another aspect, some of the plurality of enamel wire strain sensors may be evenly wound around the entire area of the composite material pressure vessel, and others of the plurality of enamel wire strain sensors may be wound around the composite material pressure vessel at locally different concentrations.

The method may further include forming an outer shell on the inner shell.

The method may further include attaching a dome made of foam plastic to at least one of both ends of the outer shell.

The composite material filament may include one or more fibers of carbon fiber, glass fiber, and aramid fiber and a resin.

A composite material pressure vessel according to another embodiment of the present invention may be manufactured by using a method of manufacturing the composite material pressure vessel according to an embodiment of the present invention.

A sensor module connected to a strain sensor to enable communication may be mounted on the entrance portion.

The sensor module may include an internal pressure sensor configured to measure an internal pressure of the composite material pressure vessel; an ambient temperature sensor configured to measure an ambient temperature; and a printed circuit board electrically connected to the strain sensor, the internal pressure sensor, and the ambient temperature sensor.

The sensor module may further include a communication connector, and the communication connector may be configured to transmit a signal measured by the sensor module or a signal generated by the sensor module.

The sensor module may further include an internal temperature sensor configured to measure an internal temperature of the composite material pressure vessel and electrically connected to the printed circuit board.

Advantageous Effects

According to the present invention, when a pressure vessel is manufactured by winding a filament around a liner, a strain sensor is formed with an enamel wire in the form of the filament and wound together with the filament, thereby easily manufacturing the composite material pressure vessel with the strain sensor, and accurately detecting the condition of the entire pressure vessel.

In addition, a plurality of strain sensors in the form of filaments are wound around the composite material pressure vessel, which may protect against damage to some strain sensors that may occur during the manufacturing process of the composite material pressure vessel, thereby ensuring measurement stability.

In addition, when a plurality of strain sensors in the form of filaments are wound around the composite material pressure vessel, different strain sensors are wound around a main part of the composite material pressure vessel at different concentrations, thereby specifying a damaged part of the composite material pressure vessel.

In addition, a sensor module including a printed circuit board is mounted on a pressure vessel, and thus, structural health monitoring (SHM) of the pressure vessel may be performed by itself using a measurement value of a strain sensor and a measurement value of a sensor module, or SHM of the pressure vessel may be performed by an external device by sending the measurement value of the strain sensor and the measurement value of the sensor module to the external device through a communication connector.

In addition, the effects obtainable or predicted by the embodiments of the present invention are to be disclosed directly or implicitly in the detailed description of the embodiments of the present invention. That is, various effects predicted according to an embodiment of the present invention will be disclosed in the detailed description to be described below.

DESCRIPTION OF THE DRAWINGS

Embodiments herein may be better understood with reference to the following description in connection with the accompanying drawings in which like reference numerals refer to identical or functionally similar elements.

FIG. 1 is a schematic perspective view of a composite material pressure vessel according to an embodiment of the present invention.

FIG. 2 is a schematic cross-sectional view of a composite material pressure vessel according to an embodiment of the present invention.

FIG. 3 is a flowchart schematically showing a method of manufacturing a composite material pressure vessel according to an embodiment of the present invention.

It should be understood that the drawings referenced above are not necessarily drawn to scale, but present a rather simplified representation of various preferred features illustrating the basic principle of the present disclosure. Specific design features of the present disclosure including, for example, specific sizes, directions, positions, and shapes, are determined in part according to specifically intended applications and environments of use.

MODE FOR INVENTION

The terms used herein are for the purpose of describing specific embodiments only, and are not intended to limit the present disclosure. As used herein, singular forms are intended to also include plural forms unless the context clearly indicates otherwise. It will also be understood that the terms "comprises" and/or "comprising" when used herein, specify the presence of mentioned features, integers, steps, actions, elements and/or components, but do not exclude the presence or addition of one or more of other features, integers, steps, actions, elements, components, and/or groups thereof. As used herein, the term "and/or" includes any one or all combinations of the associated listed items.

The terms "vehicle", "of a vehicle", or other similar terms used herein are understood to include passenger automobiles including sports utility vehicles (SUVs), buses, trucks, and various commercial vehicles, ships including various boats and vessels, railway vehicles, aircraft, drones, etc.

The "pressure vessel" as used herein means a vessel capable of temporarily storing therein a gaseous or liquid fuel containing hydrogen and a liquid containing liquefied fuel. The pressure vessel includes an inlet, and may be filled with gas or liquid through the inlet, or may discharge the gas or liquid therein to the outside.

In addition, it is understood that one or more of the methods below or aspects thereof may be executed by at least one or more control units (e.g., an electronic control unit (ECU), etc.), controllers, or control servers. The term "control unit", "controller", or "control server" may refer to a hardware device including a memory and a processor. The memory is configured to store program instructions, and the processor is specifically programmed to execute the program instructions to perform one or more processes described in more detail below. A control unit, a controller, or a control server may control operations of units, modules, parts, devices, or similar thereto, as described herein. It is also understood that the methods below may be performed by a device including a control unit or a controller along with one or more other components, as will be appreciated by those skilled in the art.

In addition, the control unit, the controller, or the control server of the present disclosure may be implemented as a non-transitory computer-readable recording medium including executable program instructions executed by a processor. Examples of computer-readable recording media include ROM, RAM, compact disk (CD) ROM, magnetic tapes, floppy disks, flash drives, smart cards, and optical data storage devices, but are not limited thereto. The computer-readable recording medium may also be distributed throughout a computer network so that program instructions may be stored and executed in a distributed manner, for example, in a telematics server or a controller area network (CAN).

According to the present invention, when a composite material pressure vessel manufactures a pressure vessel by winding a filament around a liner, a strain sensor is formed with an enamel wire in the form of the filament and wound together with the filament, thereby easily manufacturing the composite material pressure vessel with the strain sensor, and accurately detecting the condition of the entire pressure vessel. In addition, a plurality of strain sensors in the form of filaments are wound around the composite material pressure vessel, which may protect against damage to some strain sensors that may occur during the manufacturing process of the composite material pressure vessel, thereby ensuring measurement stability. In addition, when a plurality of strain sensors in the form of filaments are wound around the composite material pressure vessel, different strain sensors are wound around a main part of the composite material pressure vessel at different concentrations, thereby specifying a damaged part of the composite material pressure vessel. In addition, a sensor module including a printed circuit board is mounted on a pressure vessel, and thus, structural health monitoring (SHM) of the pressure vessel may be performed by itself using a measurement value of a strain sensor and a measurement value of a sensor module, or SHM of the pressure vessel may be performed by an external device by sending the measurement value of the strain sensor and the measurement value of the sensor module to the external device through a communication connector.

Hereinafter, embodiments of the present invention will be described in detail with reference to the accompanying drawings.

FIG. 1 is a schematic perspective view of a composite material pressure vessel according to an embodiment of the present invention. FIG. 2 is a schematic cross-sectional view of a composite material pressure vessel according to an embodiment of the present invention.

As shown in FIGS. 1 and 2, a composite material pressure vessel 1 according to an embodiment of the present invention is formed in a hollow shape so as to temporarily store hydrogen, liquid fuel, or liquefied fuel therein. The composite material pressure vessel 1, but not limited thereto, has a cylindrical shape, an entrance portion 6 is provided at one end of the composite material pressure vessel 1 to fluidly communicate with the outside, and the other end of the composite material pressure vessel 1 is blocked. Accordingly, the composite material pressure vessel 1 may be filled with gas or liquid through the entrance portion 6, or may supply the gas or liquid stored therein to necessary parts. To this end, a valve (not shown) may be provided in the entrance portion 6. For convenience of explanation, in the specification, the composite material pressure vessel 1 is exemplified as a hydrogen pressure vessel for hydrogen vehicles (cars, buses, trucks, ships, railway vehicles, aircraft, drones, etc. that use hydrogen as a power source), but may be a pressure vessel of gas or liquid for any other purpose.

The composite material pressure vessel 1 includes a body 2 and the entrance portion 6.

The body 2 is formed in a cylindrical shape and may include a liner 30, an inner shell 40, and an outer shell 50.

The liner 30 is formed in a hollow shape corresponding to the body 2. The entrance portion 6 is coupled to one end of the liner 30, and the other end of the liner 30 is blocked. The liner 30 may be made of various materials, but in an embodiment of the present invention, the liner 30 may be made of a polymer such as plastic.

The inner shell 40 entirely surrounds the liner 30 to which the entrance portion 6 is coupled. The inner shell 40 is formed by winding at least one composite material filament 42, 44, and 46 in one or more layers around an outer surface of the liner 30. The composite material filaments 42, 44, and 46 may be formed by impregnating carbon fiber, glass fiber, aramid fiber, etc. with a resin such as acrylic resin, polyester resin, isocyanate resin, epoxy resin, etc. In addition, the inner shell 40 includes at least one strain sensor 20. The strain sensor 20 is made of enamel wire, is formed in a filament of a similar shape to the composite material filaments 42, 44, and 46, and may be wound around the liner 30 together with the composite material filaments 42, 44, and 46. That is, when the strain sensor 20 forms the inner shell 40 by winding the composite material filaments 42, 44, and 46 around the liner 30, the strain sensor 20 is wound around the liner 30 together with the composite material filaments 42, 44, and 46 to form the inner shell 40. Accordingly, when the composite material pressure vessel 1 is manufactured by winding the composite material filaments 42, 44, and 46 around the liner 30, the strain sensor 20 may also be mounted on the composite material pressure vessel 1. Therefore, mounting of the strain sensor 20 for structural health monitoring (SHM) of the composite material pressure vessel 1 becomes easy.

An initial resistance value of a strain sensor currently used is about 120Ω, and when the strain sensor is deformed by receiving load, the resistance value increases, and the strain sensor measures the amount of deformation by measuring a change in the resistance value. Therefore, when the enamel wire strain sensor 20 is manufactured to have the initial resistance value of about 120Ω, the amount of deformation of the composite material pressure vessel 1 may be measured by using an existing measuring instrument. That is, the initial resistance value of the enamel wire strain sensor 20 satisfies the following equation.

$$r * L = 120$$

Here, r denotes a resistance value per unit length of the enamel wire, and L denotes a length of the enamel wire.

For example, because an enamel wire with a diameter of 0.1 mm is about 2Ω per 1 m, when the strain sensor 20 is configured by winding an enamel wire of about 60 m around the liner 30, the amount of deformation of the composite material pressure vessel 1 may be measured by using an existing measuring instrument, and calibration of the measuring instrument is easy.

The enamel wire strain sensor 20 is wound around the liner 30, and then both ends thereof extend to the entrance portion 6.

Meanwhile, when the thin and long enamel wire strain sensor 20 is wound around the liner 30, defects may occur in the enamel wire. In order to prepare for such defects, a plurality of enamel wire strain sensors 20 may be wound around the liner 30. At this time, the plurality of enamel wire strain sensors 20 may be simultaneously wound around the liner 30 by differentiating a start position where one enamel wire strain sensor 20 starts to be wound around the liner 30 from a start position where the other enamel wire strain sensor 20 starts to be wound around the liner 30. For example, when the three enamel wire strain sensors 20 are wound around the liner 30, a center angle between the start positions may be set to 120° so that the three enamel wire strain sensors 20 may be simultaneously wound around the liner 30.

In addition, the plurality of enamel wire strain sensors 20 may be wound around the liner 30 in various ways.

In an example, the plurality of enamel wire strain sensors 20 may be evenly wound around the entire area of the composite material pressure vessel 1. Accordingly, the strain sensor 20 may accurately detect a pressure change occurring throughout the composite material pressure vessel 1. In this case, the strain sensor 20 may quickly identify damage occurring in the composite material pressure vessel 1.

In another example, the plurality of enamel wire strain sensors 20 may be wound around the composite material pressure vessel 1 at different concentrations. For example, as shown in FIG. 2, the first enamel wire strain sensor 20 may be tightly wound around a boss portion 60, while may be evenly but sparsely wound around an upper portion 62, a middle portion 64, a lower portion 66, and an end portion 68, the second enamel wire strain sensor 20 may be tightly wound around the upper portion 62, while may be evenly but sparsely wound around the boss portion 60, the middle portion 64, the lower portion 66, and the end portion 68, the third enamel wire strain sensor 20 may be tightly wound around the middle portion 64, while may be evenly but sparsely wound around the boss portion 60, the upper portion 62, the lower portion 66, and the end portion 68, the fourth enamel wire strain sensor 20 may be tightly wound around the lower portion 66, while may be evenly but sparsely wound around the boss portion 60, the upper portion 62, the middle portion 64, and the end portion 68, and the fifth enamel wire strain sensor 20 may be tightly wound around the end portion 68, while may be evenly but sparsely wound around the boss portion 60, the upper portion 62, the middle portion 64, and the lower portion 66. In this case, damage occurring in the boss portion 60 may be identified by using the first enamel wire strain sensor 20, damage occurring in the upper portion 62 may be identified by using the second enamel wire strain sensor 20, damage occurring in the middle portion 64 may be identified by using the third enamel wire strain sensor 20, damage occurring in the lower portion 66 may be identified by using the fourth enamel wire strain sensor 20, and damage occurring in the end portion 68 may be identified by using the fifth enamel wire strain sensor 20. As such, the plurality of enamel wire strain sensors 20 are wound around a main part (e.g., a part where damage frequently occurs) of the composite material pressure vessel 1 respectively at different concentrations, and thus, a part of the composite material pressure vessel 1 where a defect occurs may be specified, and data learning for SHM may be quickly achieved.

In another example, some of the enamel wire strain sensors 20 may be evenly wound around the entire area of the composite material pressure vessel 1, and the other enamel wire strain sensors 20 may be wound around the composite material pressure vessel 1 at different concentrations.

Referring to FIGS. 1 and 2, the outer shell 50 surrounds the outside of the inner shell 40. The outer shell 50 may absorb an external impact applied to the composite material pressure vessel 1. The outer shell 50 may be formed of resin, and the resin forming the outer shell 50 may be the same as or different from the resin forming the composite material filaments 42, 44, and 46.

In order to further protect the composite material pressure vessel 1 from the external impact, the body 2 may further include first and second domes 3 and 4. The first and second domes 3 and 4 may be made of foam plastic and may be respectively installed at both ends of the composite material pressure vessel 1.

The entrance portion 6 is coupled to one end of the liner 30, and a passage 7 is formed inside the entrance portion 6 to fluidly communicate with the outside of the liner 30 and the inside of the liner 30. At least a part of the entrance portion 6 is surrounded by the inner shell 40, the outer shell 50, and the first dome 3. One end of the entrance portion 6 is further extended to one side in a longitudinal direction and is fluidly connected to other parts by using a tube, a hose, a pipe, etc. A sensor module 10 is mounted on one end of the entrance portion 6. In addition, the other end of the entrance portion 6 penetrates one end of the liner 30 and is located inside the liner 30. An internal temperature sensor 15 is mounted on the other end of the entrance portion 6 to measure an internal temperature of the composite material pressure vessel 1.

The sensor module 10 is mounted on one end of the entrance portion 6 and may include an internal pressure sensor 11, an ambient temperature sensor 12, a communication connector 13, and a printed circuit board 14. In addition, both ends of the enamel wire strain sensor 20 extending to the entrance portion 6 are connected to the sensor module 10 to transmit a measurement value of the strain sensor 20 or a signal thereof to the sensor module 10. When the plurality of enamel wire strain sensors 20 are used, both ends of the different strain sensors 20 are connected to different channels of the sensor module 10 so that the sensor module 10 may recognize the measurement value of each of the strain sensors 20 and compare the measurement value of one strain sensor 20 with the measurement value of the other strain sensor 20.

The internal pressure sensor 11 measures the internal pressure of the composite material pressure vessel 1. The internal pressure sensor 11 may be mounted on the passage 7, but is not limited thereto. The internal pressure sensor 11 may be mounted within the composite material pressure vessel 1 together with the internal temperature sensor 15.

The ambient temperature sensor 12 measures an ambient temperature outside the composite material pressure vessel 1. The ambient temperature sensor 12 may be mounted on the sensor module 10 or may be mounted on the outside of the composite material pressure vessel 1 to transmit a signal of the ambient temperature to the sensor module 10. In contrast, the sensor module 10 may receive the signal of the ambient temperature from the ambient temperature sensor 12 mounted on a hydrogen vehicle.

The communication connector 13 connects the sensor module 10 to an external server (not shown), an external computing device (not shown), or a mobile device (not shown) to enable communication. The communication connector 13 may be a wireless or wired connector.

The printed circuit board 14 is connected to the strain sensor 20, the internal pressure sensor 11, the ambient temperature sensor 12, and the internal temperature sensor 15 to enable communication to receive a strain of the composite material pressure vessel 1, the internal pressure and/or internal temperature of the composite material pressure vessel 1, and/or the signal of the ambient temperature. The printed circuit board 14 may include a controller (not shown). The controller may diagnose defects of the composite material pressure vessel 1 and calculate the remaining lifespan based on the strain of the composite material pressure vessel 1, the internal pressure and/or internal temperature of the composite material pressure vessel 1, and/or the signal of the ambient temperature. The printed circuit board 14 is connected to the external server, the external computing device, and/or the mobile device through the communication connector 13 to enable wired or wireless communication to transmit the strain of the composite material pressure vessel 1, the internal pressure and/or internal temperature of the composite material pressure vessel 1, and/or the signal of the ambient temperature to the external server, the external computing device, and/or the mobile device. In addition, when the controller is capable of self-diagnosing the composite material pressure vessel 1, the printed circuit board 14 may transmit a signal corresponding to a diagnosis result of the composite material pressure vessel 1 to the external server, the external computing device, and/or the mobile device.

Hereinafter, with reference to FIG. 3, a method of manufacturing the composite material pressure vessel 1 according to an embodiment of the present invention will be described.

FIG. 3 is a flowchart schematically showing a method of manufacturing a composite material pressure vessel according to an embodiment of the present invention.

As shown in FIG. 3, the method of manufacturing the composite material pressure vessel 1 according to an embodiment of the present invention starts at step S100, and sequentially performs steps S120 and S130. In addition, step S110 may optionally be performed between step S100 and step S120, and step S140 may be optionally performed after step S130.

In step S100, the liner 30 to which the entrance portion 6 is coupled is prepared. As described above, the liner 30 is previously made of a polymer such as plastic or metal, and the previously manufactured entrance portion 6 is coupled to one end of the liner 30. Although not shown in FIG. 3, the sensor module 10 may be mounted on one end of the entrance portion 6. The other end of the entrance portion 6 penetrates one end of the liner 30 and is located inside the liner 30, and the internal temperature sensor 15 may be mounted on the other end of the entrance portion 6. The sensor module 10 may include the internal pressure sensor 11, the ambient temperature sensor 12, the communication connector 13, and the printed circuit board 14.

In step S110, at least one basic filament 42 is wound around the liner 30 to which the entrance portion 6 is coupled in a longitudinal direction. The basic filament 42 may be a composite resin filament formed by impregnating carbon fiber, glass fiber, aramid fiber, etc. with a resin such as acrylic resin, polyester resin, isocyanate resin, epoxy resin, etc. The basic filament 42 is intended to facilitate winding of the first and second filaments 44 and 46, and does not necessarily need to be wound around the liner 30.

In step S120, the first and second filaments 44 and 46 are wound around the liner 30 to form the inner shell 40. The first and second filaments 44 and 46 may be composite resin filaments formed by impregnating carbon fiber, glass fiber, aramid fiber, etc. with a resin such as acrylic resin, polyester resin, isocyanate resin, epoxy resin, etc. The first and second filaments 44, 46 may be wound around the liner 30 to intersect with each other and/or with the basic filament 42. In addition, when the first and second filaments 44 and 46 are wound around the liner 30, at least one strain sensor 20 is wound around the liner 30 together. As described above, the strain sensor 20 is made of an enamel wire of a set thickness in the shape of a filament of a set length. The enamel wire strain sensor 20 in the shape of the filament replaces a part of the first filament 44 or a part of the second filament 46, or is wound around the liner 30 together with the first filament 44 or the second filament 46. Alternatively, the first and second filaments 44 and 46 are wound around the liner 30 in one or more layers, the enamel wire strain sensor 20 is wound, and then, the first and second filaments 44 and 46 are again wound in one or more layers. In addition, a plurality of enamel wire strain sensors 20 may be simultaneously wound around the liner 30 by differentiating start positions where the plurality of enamel wire strain sensors 20 start to be wound around the liner 30. Furthermore, the plurality of enamel wire strain sensors 20 may be evenly wound around the entire area of the composite material pressure vessel 1 or may be wound around a main part of the composite material pressure vessel 1 at different concentrations. At this time, both ends of each strain sensor 20 extend to the entrance portion. After the at least one strain sensor 20 is wound around the liner 30, both ends of the strain sensor 20 are electrically connected to the sensor module 10.

In step S130, the outer shell 50 is formed on the inner shell 40. As mentioned above, the outer shell 50 may be the same as or different from the resin forming the composite material filaments 42, 44, and 46. The outer shell 50 may be formed by applying the resin or by placing the liner 30 on which the inner shell 40 is formed in a mold and injecting the resin. However, the method of forming the outer shell 50 is not limited to the methods illustrated above.

In step S140, the composite material pressure vessel 1 is manufactured by attaching the first dome 3 to one end of the outer shell 50 and attaching the second dome 4 to the other end of the outer shell 50.

Although the preferred embodiments of the present invention have been described above, the present invention is not limited to the above embodiments, and includes all changes within the range that is easily changed and recognized as equivalent by those skilled in the art from the embodiments of the present invention.

The invention claimed is:

1. A method of manufacturing a composite material pressure vessel, the method comprising:
   preparing a liner provided with an entrance portion; and
   forming an inner shell by winding at least one composite material filament around the liner,
   wherein the forming of the inner shell includes simultaneously winding a plurality of enamel wire strain sensors around the liner together with the composite material filament by differentiating a start point where each of the plurality of enamel wire strain sensors manufactured in the form of a filament starts to be wound around the liner.

2. The method of claim 1, wherein:
   the plurality of enamel wire strain sensors are evenly wound around the entire area of the composite material pressure vessel.

3. The method of claim 1, wherein:
   the plurality of enamel wire strain sensors are wound around the composite material pressure vessel at locally different concentrations.

4. The method of claim 1, wherein:
   some of the plurality of enamel wire strain sensors are evenly wound around the entire area of the composite material pressure vessel, and others of the plurality of enamel wire strain sensors are wound around the composite material pressure vessel at locally different concentrations.

5. The method of claim 1, further comprising:
   forming an outer shell on the inner shell.

6. The method of claim 5, further comprising:
   attaching a dome made of foam plastic to at least one of both ends of the outer shell.

7. The method of claim 1, wherein:
   the composite material filament includes one or more fibers of carbon fiber, glass fiber, and aramid fiber and a resin.

8. A composite material pressure vessel manufactured by using the method of manufacturing the composite material pressure vessel of claim 1.

9. The composite material pressure vessel of claim 8, wherein:
   a sensor module connected to a strain sensor to enable communication is mounted on an entrance portion.

10. The composite material pressure vessel of claim 9, wherein:
    the sensor module includes
    an internal pressure sensor configured to measure an internal pressure of the composite material pressure vessel;
    an ambient temperature sensor configured to measure an ambient temperature; and
    a printed circuit board electrically connected to the strain sensor, the internal pressure sensor, and the ambient temperature sensor.

11. The composite material pressure vessel of claim 10, wherein:
    the sensor module further includes a communication connector, and
    the communication connector is configured to transmit a signal measured by the sensor module or a signal generated by the sensor module.

12. The composite material pressure vessel of claim 11, wherein:
the sensor module further includes an internal temperature sensor configured to measure an internal temperature of the composite material pressure vessel and electrically connected to the printed circuit board.

* * * * *